US011968253B2

(12) United States Patent
Ueno et al.

(10) Patent No.: US 11,968,253 B2
(45) Date of Patent: Apr. 23, 2024

(54) REQUEST DELIVERY DEVICE, REQUEST DELIVERY METHOD, AND REQUEST DELIVERY PROGRAM

(71) Applicant: Nippon Telegraph and Telephone Corporation, Tokyo (JP)

(72) Inventors: Masaki Ueno, Musashino (JP); Noritaka Horikome, Musashino (JP); Kenta Shinohara, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 18/015,368

(22) PCT Filed: Jul. 10, 2020

(86) PCT No.: PCT/JP2020/027012
§ 371 (c)(1),
(2) Date: Jan. 10, 2023

(87) PCT Pub. No.: WO2022/009415
PCT Pub. Date: Jan. 13, 2022

(65) Prior Publication Data
US 2023/0319134 A1 Oct. 5, 2023

(51) Int. Cl.
*H04L 67/1014* (2022.01)
*H04L 67/1097* (2022.01)
*H04L 67/62* (2022.01)

(52) U.S. Cl.
CPC ...... *H04L 67/1014* (2013.01); *H04L 67/1097* (2013.01); *H04L 67/62* (2022.05)

(58) Field of Classification Search
CPC .. H04L 67/1014; H04L 67/62; H04L 67/1097
See application file for complete search history.

(56) References Cited

U.S. PATENT DOCUMENTS

2005/0223272 A1 10/2005 Yasuhara
2011/0258268 A1* 10/2011 Banks .................. G06Q 10/06
709/206
(Continued)

FOREIGN PATENT DOCUMENTS

JP 2005293147 10/2005
JP 2018157466 10/2018

OTHER PUBLICATIONS

Cloud Native Computing Foundation, "Introduction—NATS Docs," NATS Docs, retrieved on May 20, 2020, retrieved from URL <https://docs.nats.io/>, 1 page.

*Primary Examiner* — Chris Parry
*Assistant Examiner* — Steven C Nguyen
(74) *Attorney, Agent, or Firm* — Fish & Richardson P.C.

(57) ABSTRACT

A load balancer includes: a request queue that stores a request scheduled to be transmitted to a server; a transmission unit that transmits a request read from the request queue to the server capable of processing the request; a reception unit that receives a completion message indicating that processing of the request is completed; and a completion list that stores the completion message, and the transmission unit discards a request for which the completion message is stored in the completion list without transmitting the request to the server, and transmits, to the server, a request for which the completion message is not stored in the completion list and stores the request again in the request queue.

7 Claims, 7 Drawing Sheets

(56) References Cited

U.S. PATENT DOCUMENTS

| | | | |
|---|---|---|---|
| 2015/0207857 A1* | 7/2015 | Horton | H04L 67/51 |
| | | | 709/204 |
| 2020/0050504 A1* | 2/2020 | Moradi | G06F 11/3409 |
| 2021/0176324 A1* | 6/2021 | Shetty | H04L 51/216 |

* cited by examiner

Fig. 4

| TIME | REQUEST QUEUE | SERVER | COMPLETION LIST |
|---|---|---|---|
| t11 | [M1], ···, [M7] | – | – |
| t12 | [M7], ···, [M12] | – | [M1], ···, [M4] |
| t13 | [M8], ···, [M12], [M7] | [SA=M7] → SUCCESS | [M1], ···, [M4], [M7] |
| t14 | [M7], ···, [M20] | | [M1], ···, [M7], ··· |
| t15 | [M8], ···, [M20] | | [M1], ···, [M7], ··· |

Fig. 5

| TIME | REQUEST QUEUE | SERVER | COMPLETION LIST |
|---|---|---|---|
| t11 | [M1], ⋯, [M7] | – | – |
| t12 | [M7], ⋯, [M12] | – | [M1], ⋯, [M4] |
| t21 | [M8], ⋯, [M12], [M7] | [SA=M7] → FAILURE | [M1], ⋯, [M4] |
| t22 | [M7], ⋯, [M20] | | [M1], ⋯, [M4] |
| t23 | [M8], ⋯, [M12], [M7] | [SB=M7] → SUCCESS | [M1], ⋯, [M7], ⋯ |
| t24 | [M7], ⋯, [M20] | | [M1], ⋯, [M7], ⋯ |
| t25 | [M8], ⋯, [M20] | | [M1], ⋯, [M7], ⋯ |

Fig. 6

| TIME | REQUEST QUEUE | SERVER | COMPLETION LIST |
|---|---|---|---|
| t11 | [M1], ..., [M7] | - | - |
| t12 | [M7], ..., [M12] | - | [M1], ..., [M4] |
| t21B | [M8], ..., [M12], [M7] | [SA=M7] →DELAY | [M1], ..., [M4] |
| t22 | [M7], ..., [M20] | | [M1], ..., [M4] |
| t23 | [M8], ..., [M12], [M7] | [SB=M7] →SUCCESS | [M1], ..., [M7], ... |
| t24 | [M7], ..., [M20] | | [M1], ..., [M7], ... |
| t25 | [M8], ..., [M20] | | [M1], ..., [M7], ... |
| t26 | [M12], ..., [M25] | [SA=M7] →SUCCESS | [M1], ..., [M7], ... |
| t27 | | [SA=M7] →RB | |

REQUEST DELIVERY DEVICE, REQUEST DELIVERY METHOD, AND REQUEST DELIVERY PROGRAM

CROSS-REFERENCE TO RELATED APPLICATIONS

This application is a National Stage application under 35 U.S.C. § 371 of International Application No. PCT/JP2020/027012, having an International Filing Date of Jul. 10, 2020, the disclosure of which is considered part of the disclosure of this application, and is incorporated by reference in its entirety into this application.

TECHNICAL FIELD

The present invention is a technology of a request delivery device, a request delivery method, and a request delivery program.

BACKGROUND ART

In a server-client type system, a method called N-ACT (Active) that distributes requests to a plurality of servers having the same function is conventionally known. In the conventional N-ACT type system, information of a distribution destination server such as an IP address is registered in advance with respect to a distribution function called a load balancer. After receiving a request from a client, the load balancer performs load distribution by distributing the request to the registered distribution destination server.

In addition, in recent years, there has been a method of distributing messages to a server using a function of middleware that is called a message queue (MQ) and is responsible for message delivery between entities, thereby implementing load distribution (Non Patent Literature 1).

FIG. 7 is a configuration diagram of a message communication system $100z$ using a MQ.

The message communication system $100z$ includes a publisher $1z$, a message broker $2z$, and subscribers $3z$.

First, the subscriber $3z$ clearly indicates an attribute (Topic) of a request that the subscriber $3z$ itself wants to receive (can handle) in advance to the message broker $2z$, and subscribes to the request. The message broker $2z$ stores the subscriber $3z$ to be subscribed for each Topic.

Next, the publisher $1z$ sets the Topic of the request to be transmitted by the publisher $1z$ itself, and then issues (publishes) the request to the message broker $2z$.

Then, the message broker $2z$ receives the request published from the publisher $1z$, and performs load distribution among the subscribers $3z$ by delivering the request to any one of the subscribers $3z$ that have subscribed to the topic set in the request.

CITATION LIST

Non Patent Literature

Non Patent Literature 1: NATS Docs, "The Importance of Messaging", [online], [Retrieved on Jul. 2, 2020], Internet <URL:https://docs.nats.io/>

SUMMARY OF INVENTION

Technical Problem

In the conventional load distribution method, only a simple function that an intermediary (N-ACT type load balancer, the message broker $2z$ in FIG. 7) distributes a request to a server is provided, but it is not guaranteed that the distributed request will be processed normally by the server.

For example, since a conventional load balancer does not sense whether or not a distribution destination server is currently in a processable state, there is a concern that a request will be distributed to a server in a state in which the request cannot be processed due to an application error, a hardware failure, or the like (no entrance guarantee).

In addition, in the message communication system $100z$ using the MQ, the message broker $2z$ performs the periodic health check on the subscribers $3z$ that have subscribed, and delivers the request only to a subscriber $3z$ that has succeeded in the health check. Further, the message broker $2z$ may perform vital monitoring of the subscriber $3z$ to which the request is distributed. Thus, the request can be reliably transmitted to the subscriber $3z$ that can process the request (with entrance guarantee).

However, in the N-ACT type load balancer or the MQ type message broker $2z$, it cannot be guaranteed that the distributed request is processed normally by the server (no exit guarantee).

Therefore, a main object of the present invention is to provide a load distribution method capable of guaranteeing processing of distributed requests.

Solution to Problem

To achieve the above object, a request delivery device of the present invention has the characteristics described below. The present invention includes: a request storage unit that stores a request scheduled to be transmitted to a server; a transmission unit that transmits a request read from the request storage unit to the server capable of processing the request; a reception unit that receives a completion message indicating that processing of the request is completed; and a completion list storage unit that stores information of the completion message, and the transmission unit discards a request for which the information of the completion message is stored in the completion list storage unit without transmitting the request to the server, and transmits, to the server, a request for which the information of the completion message is not stored in the completion list storage unit and stores the request again in the request storage unit.

Advantageous Effects of Invention

According to the present invention, it is possible to provide a load distribution method capable of guaranteeing processing of distributed requests.

BRIEF DESCRIPTION OF DRAWINGS

FIG. 4 is a time table illustrating a case where a request is processed normally by a server according to the present embodiment.

FIG. 5 is a time table illustrating a case where a request is not processed due to a failure of the server according to the present embodiment.

FIG. 6 is a time table illustrating a case where a processing delay occurs in the server according to the present embodiment.

DESCRIPTION OF EMBODIMENTS

Hereinafter, an embodiment of the present invention will be described in detail with reference to the drawings.

Figure 1:
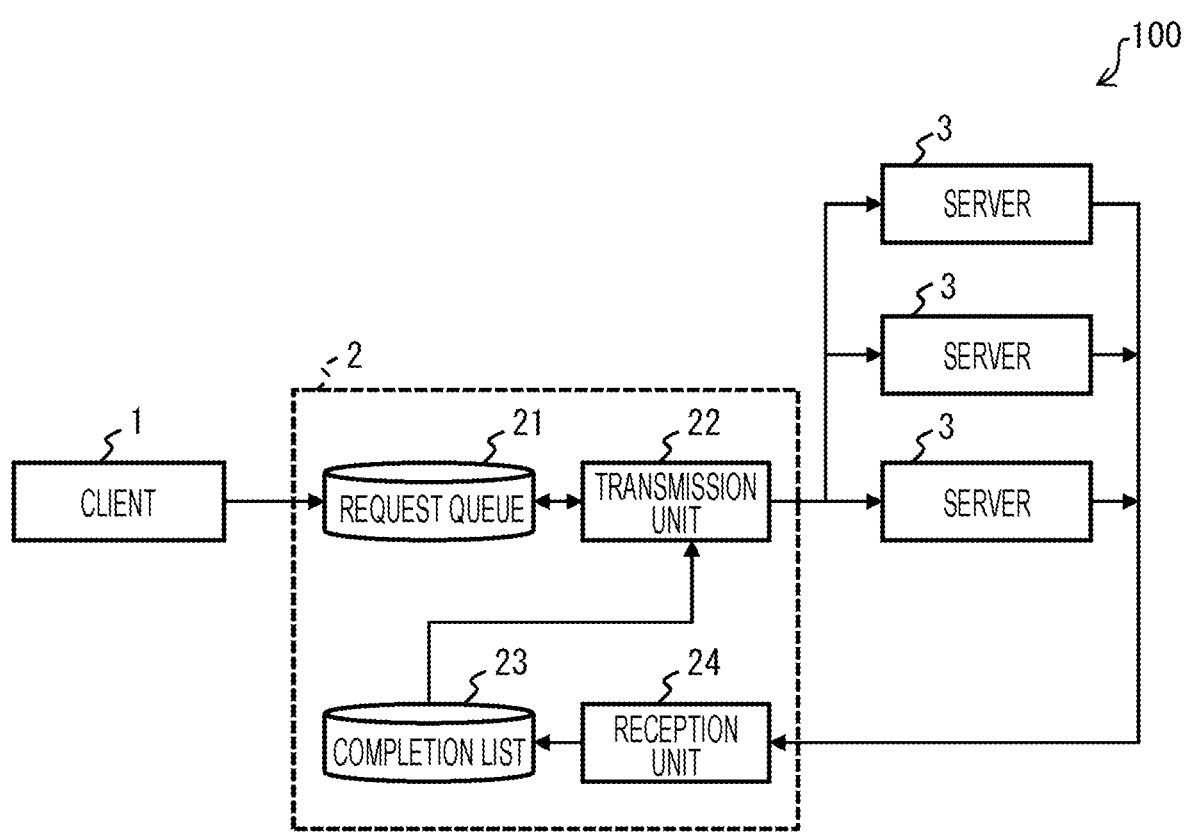
FIG. 1 is a configuration diagram of a message communication system according to the present embodiment.

FIG. 1 is a configuration diagram of a message communication system 100.

The message communication system 100 includes a client 1, a load balancer (request delivery device) 2, and a server 3, which are connected via a network.

Figure 7:
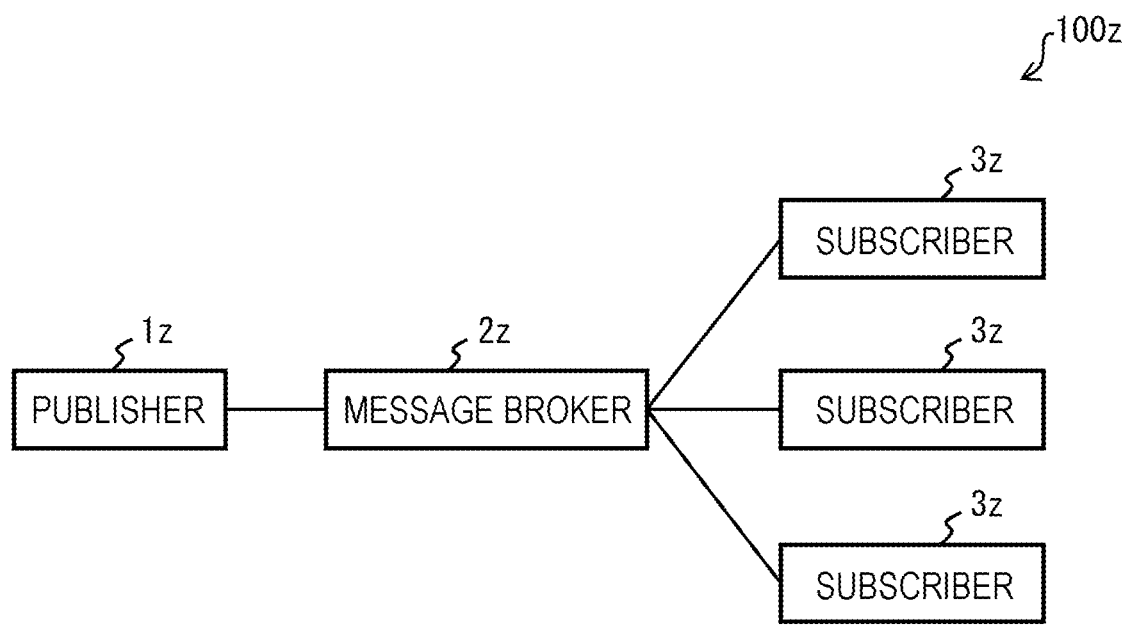
FIG. 7 is a configuration diagram of a message communication system using MQ.

First, similarly to the subscriber 3z in FIG. 7, the server 3 clearly indicates an attribute (Topic) of a request that the server 3 itself wants to receive (can handle) in advance to the load balancer 2, and subscribes to the request. Similarly to the message broker 2z in FIG. 7, the load balancer 2 stores the IP address of the server 3 to be subscribed for each Topic.

Next, similarly to the publisher 1z in FIG. 7, the client 1 sets the Topic of the request to be transmitted by the client 1 itself, and then issues (publishes) the request to the load balancer 2.

Then, the load balancer 2 receives the request published from the client 1, and performs load distribution among the servers 3 by delivering the request to any one of the servers 3 that have subscribed to the topic set in the request.

Furthermore, unlike the publisher 1z in FIG. 7, the server 3 notifies the load balancer 2 of completion of processing of the request received from the load balancer 2 as a completion message.

The load balancer 2 includes a request queue (request storage unit) 21, a transmission unit 22, a completion list (completion list storage unit) 23, and a reception unit 24.

The request queue 21 is a temporary storage area that holds requests received from the client 1 in order of distribution to the server 3.

The transmission unit 22 takes out (pops) a request at the head from the request queue 21 and delivers the request to any one of the servers 3 that have subscribed to the topic set in the request. Here, even if the request has been transmitted to the server 3 once, the transmission unit 22 stores (pushes) the transmitted request at the end of the request queue 21 until it is confirmed that the server 3 has processed the request normally, and prepares for delivery of the next request.

The request queue 21 and the transmission unit 22 are implemented by, for example, MQ middleware. Thus, since the MQ of the load balancer 2 can be commonly used by all applications using the MQ as middleware, it is possible to expect a reduction in implementation cost of the application.

The completion list 23 is a storage area that holds information of a completion message that is a response from the server 3 indicating that the processing of the request has been completed. It is assumed that information of the request is stored in the completion message. The information of the request is allowed in any format that can be specified by the request, but is desirably hashed using Message Digest Algorithm 5 (MD 5) or the like from the viewpoint of reducing the table size held by the load balancer 2.

When receiving the completion message from the server 3, the reception unit 24 reads information of the request stored in the completion message, and stores the read information in the completion list 23.

Figure 2:
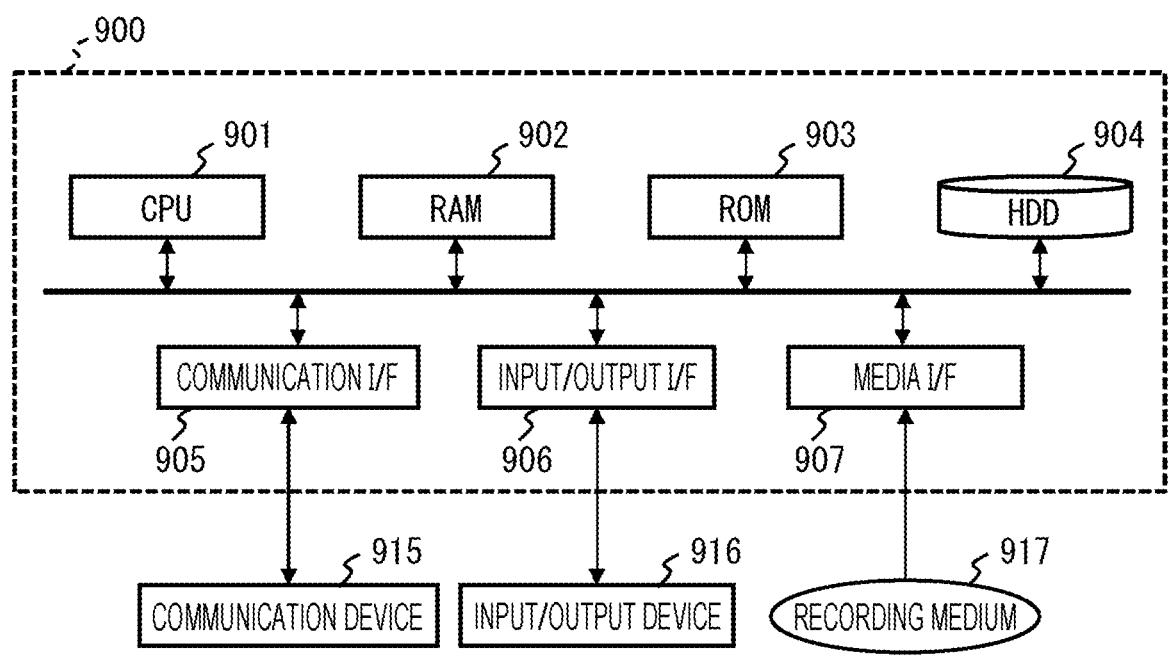
FIG. 2 is a hardware configuration diagram of each device of the message communication system of FIG. 1 according to the present embodiment.

FIG. 2 is a hardware configuration diagram of each device of the message communication system 100 of FIG. 1.

Each of the devices (the client 1, the load balancer 2, and the server 3) of the message communication system 100 includes a computer 900 including a CPU 901, a RAM 902, a ROM 903, an HDD 904, a communication I/F 905, an input/output I/F 906, and a media I/F 907.

The communication I/F 905 is connected to an external communication device 915. The input/output I/F 906 is connected to an input/output device 916. The media I/F 907 reads and writes data from and to a recording medium 917. Moreover, the CPU 901 controls each processing unit by executing a program (also referred to as an application or an app for abbreviation thereof) read into the RAM 902. Then, the program can be distributed via a communication line or recorded in a recording medium 917 such as a CD-ROM and distributed.

Figure 3:
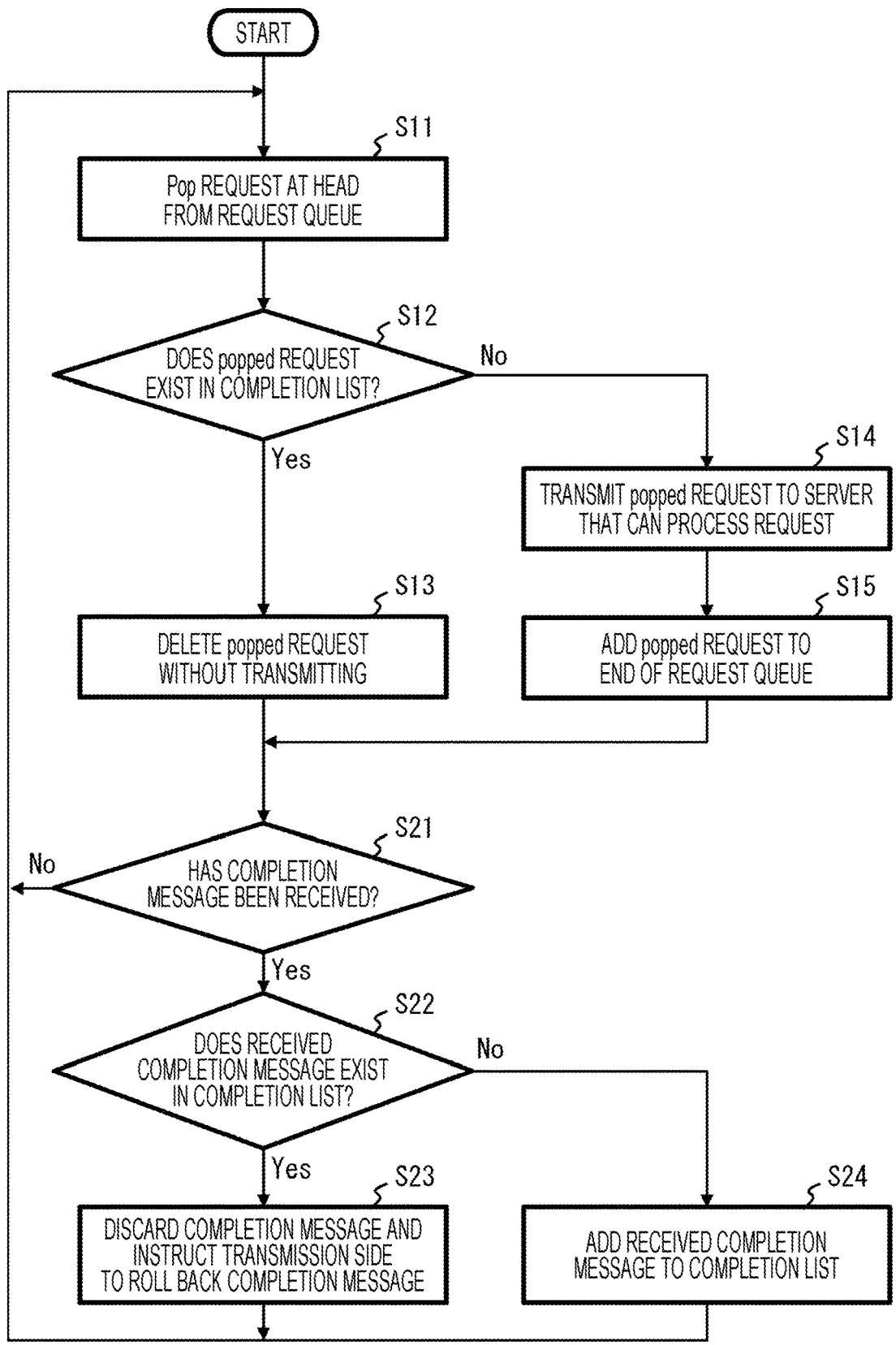
FIG. 3 is a flowchart illustrating transmission processing in a load balancer according to the present embodiment.

FIG. 3 is a flowchart illustrating transmission processing in the load balancer 2.

At S11, the transmission unit 22 pops a request at the head from the request queue 21. At S12, the transmission unit 22 determines whether or not the popped request exists in the completion list 23. If Yes in S12, the process proceeds to S13, and if No, the process proceeds to S14.

At S13, since the normal completion of the request has been confirmed, the transmission unit 22 does not transmit the popped request and deletes the popped request from the request queue 21.

At S14, since the request transmitted last time has not been completed normally yet, the transmission unit 22 transmits the popped request to the server 3 that can process the request. The server 3 that can process the request is, for example, the server 3 that has succeeded in the health check among the subscribers of the Topic of the request.

Here, it is desirable that the transmission unit 22 transmit the request to be transmitted this time to a server 3 different from the server 3 to which the request has been previously transmitted.

At S15, the transmission unit 22 adds the popped request to the end of the request queue 21. Thus, unless processing in the server 3 is completed, the request is held in the request queue 21 in the load balancer 2, and transmission to the server 3 is repeated.

At S21, the reception unit 24 determines whether or not a completion message for the request transmitted at S14 has been received. If Yes in S21, the process proceeds to S22, and if No, the process returns to S11.

At S22, the reception unit 24 determines whether or not the received completion message already exists in the completion list 23. If Yes in S22, the process proceeds to S23, and if No, the process proceeds to S24.

At S23, the reception unit 24 discards the completion message received this time, and instructs the server 3 on the transmission side of the completion message to roll back the request corresponding to the completion message (processing of returning to the state before the processing is performed).

At S24, the reception unit 24 adds information of the received completion message to the completion list 23.

The overview of the message communication system 100 has been described above with reference to FIGS. 1 to 3. Hereinafter, processing in the following three cases will be described with reference to steps (S11 to S24) in FIG. 3 as appropriate.

[Case 1] A case where a request is processed normally by the server 3 (description of FIG. 4).

[Case 2] A case where a request is not processed due to a failure of the server 3 (description of FIG. 5).

[Case 3] A case where a processing delay occurs in the server 3 (description of FIG. 6).

FIG. 4 is a time table illustrating a case where a request is processed normally by the server 3.

In this time table, a first column of a time that elapses downward in the table, a second column indicating the state of the request queue 21 at that time, a third column indicating the state of request processing of the server 3, and a fourth column indicating the state of the completion list 23 are associated with each other (FIGS. 5 and 6 have the same format).

Note that, in FIGS. 4 to 6, identifiers Mi (i=1, 2, . . . ) in parentheses such as [M1] and [M2] indicate individual requests. The smaller i is, the earlier the request arrives at the load balancer 2. In the following description, the request of [M7] will be focused upon.

At time t11, the load balancer 2 receives the following new request [M7] and stores the request [M7] at the end of the request queue 21.

topic: "aaa"
message: "Hello, how are you?"

Therefore, the request queue 21 in the second column sequentially stores requests from [M1] at the head to [M7] at the end. Here, no request is assigned to the server 3, and thus no request is stored in the completion list 23.

At time t12, the transmission unit 22 transmits several requests including the request [M1] to the server 3. Then, the reception unit 24 receives some completion messages (here, [M1], . . . , and [M4]) from the server 3, and registers the completion messages in the completion list 23. Then, the transmission unit 22 reads the request [M7] to be processed next from the head of the request queue 21 (S11).

Then, the transmission unit 22 confirms that the read request [M7] does not yet exist in the completion list 23 (S12, No). This confirmation method includes, for example, a method of determining that when the MD5 hash value calculated from the request [M7] does not match an MD5 hash value of any entry in the completion list 23, the request [M7] does not yet exist in the completion list 23.

At time t13, the transmission unit 22 transmits the request [M7] to the server 3 (assumed to be SA in this case) that subscribes to topic: "aaa" (S14), and returns the request [M7] to the end of the request queue 21 (S15). Then, the reception unit 24 receives the following completion message [M7] from the server 3 that has processed the request normally [M7] (S21, Yes).

topic: "bbb"
message: "I'm fine."
processed_message:
"ee82180acb899fc9c6ddfbb9cc89d20d"

The server 3 stores the MD5 hash value of the request [M7] in the processed message field. The reception unit 24 adds the MD5 hash value of the request [M7] to the completion list 23 (S22, No→S24).

Note that the request identifier described in the processed_message field is an MD5 hash value, but the description format is not limited as long as the processed request can be specified. The following is an example in which a request indicated by topic: "aaa" (lines 4 and 5 below) is described in a completion message indicated by topic: "bbb" (lines 1 to 3 below) without being hashed.

topic: "bbb"
message: "I'm fine."
processed message:
topic: "aaa"
message: "Hello, how are you?"

Furthermore, in the example described without hashing, if the topic and the request content are the same, it is recognized that even actually different requests are the same. In order to avoid this, the server 3 may add information that can uniquely specify the request, such as a time stamp, to the completion message.

Since the server 3 gives a time stamp to the request and describes the request without hashing, it is possible to monitor the processing status of the request in the message communication system 100, and it is also possible to obtain an effect in terms of maintenance operation. Therefore, the client 1 (or a management terminal (not illustrated)) receives a completion message including a request described without being hashed from the server 3 or the load balancer 2, and displays the completion message on its display screen.

At time t14, the request [M7] added to the end at time t13 reaches the head of the request queue 21 again. The transmission unit 22 confirms that the read request [M7] exists in the completion list 23 (S12, Yes).

At time t15, the transmission unit 22 deletes the request [M7] at the head in the request queue 21 without transmitting the request to the server 3 (S13). Here, since the transmission unit 22 can confirm that the request [M7] has been processed normally, the entry of [M7] may be immediately deleted from the completion list 23, may be deleted after waiting for a predetermined time, or may be permanently held without being deleted.

By deleting the entry in which the request is discarded normally from the completion list 23, the memory resource consumed by the load balancer 2 itself can be restricted.

FIG. 5 is a time table illustrating a case where a request is not processed due to a failure of the server 3.

Since times t11 and t12 are the same as those in FIG. 4, the description thereof will be omitted.

At time t21, similarly to time t13, the transmission unit 22 transmits the request [M7] to the server 3 (assumed to be SA in this case) that subscribes to topic: "aaa" (S14), and returns the request [M7] to the end of the request queue 21 (S15).

However, unlike time t13, it is assumed that the execution fails at time t21 due to a failure of the server 3 (SA). In other words, since the request [M7] is lost in the server 3 (SA), the reception unit 24 that cannot receive the completion message of the request [M7] cannot add the request [M7] to the completion list 23.

At time t22, the request [M7] added to the end at time t21 reaches the head of the request queue 21 again. The transmission unit 22 confirms that the read request [M7] does not yet exist in the completion list 23 (S12, No).

At time t23, the transmission unit 22 transmits the request [M7] to a server 3 (assumed to be SB in this case) different from the previous destination that subscribes to topic: "aaa" (S14), and returns the request [M7] to the end of the request queue 21 (S15).

The reception unit 24 receives the following completion message [M7] from the server 3 (SB) that has processed the request normally [M7] (S21, Yes).

topic: "bbb"
message: "I'm fine."
processed message:
"ee82180acb899fc9c6ddfbb9cc89d20d"

The reception unit 24 adds the MD5 hash value of the request [M7] to the completion list 23 (S22, No→S24).

Note that, regarding the request transmission processing, the first transmission to the server 3 (SA) at time t21 and the second transmission to the server 3 (SB) at time t23 have been described in order. In a case where the number of requests held in the request queue 21 is small, the transmitted request immediately returns to the head of the request queue 21. Therefore, a large amount of message transmission may occur in a very short time, and the system load may be excessive.

Therefore, the transmission unit 22 may perform backoff control such that the message transmitted once is not retransmitted for a predetermined period (such that the transmission interval is not too short). In a case where the backoff control is performed, the transmission unit 22 can wait for the current transmission timing until a predetermined period after the previous transmission time by adding the previous transmission time to the message as a time stamp. Note that the message may be returned to the end of the request queue 21 at the wait time.

At time t24, the request [M7] added to the end at time t23 reaches the head of the request queue 21 again. The transmission unit 22 confirms that the read request [M7] exists in the completion list 23 (S12, Yes).

At time t25, the transmission unit 22 deletes the request [M7] at the head in the request queue 21 without transmitting the request to the server 3 (S13).

FIG. 6 is a time table illustrating a case where a processing delay occurs in the server 3.

Times t11 and t12 are the same as those in FIG. 4.

Time t21B in FIG. 6 is replaced with time t21 in FIG. 5. At time t21, the request [M7] is permanently lost due to a failure of the server 3 (SA), but at time t21B, the processing of the server 3 (SA) is delayed, and the execution completion timing is considerably delayed (time t26 to be described later). Therefore, since the processing is not completed at time t21B (S21, No), the reception unit 24 cannot add the request [M7] to the completion list 23 at the present time.

Times t22 to t25 are the same as those in FIG. 5. In other words, when the server 3 (SB) that has transmitted the request [M7] for the second time at time t23 succeeds in the processing, the reception unit 24 can add the MD5 hash value of the request [M7] to the completion list 23.

At time t26, a completion message of the following [M7] from the server 3 (SA) arrives at the load balancer 2 with a delay (S21, Yes).
  topic: "bbb"
  message: "Not bad."
  processed_message:
  "ee82180acb899fc9c6ddfbb9cc89d20d"

However, at time t23, since the hash value of the request [M7] has already been stored in the completion list 23 (S22, Yes), the transmission unit 22 discards the completion message of [M7] from the server 3 (SA) (S23).

At time t27, the load balancer 2 notifies the server 3 (SA) that the processing of [M7] has already been completed by another server 3 (SB), thereby prompting a roll back (RB) process (cancellation) of the processing of [M7] that has been redundantly executed by the server 3 (SA).

Effects

The load balancer 2 of the present invention includes: the request queue 21 that stores a request scheduled to be transmitted to the server 3; the transmission unit 22 that transmits a request read from the request queue 21 to the server 3 capable of processing the request; the reception unit 24 that receives a completion message indicating that processing of the request is completed; and the completion list 23 that stores the completion message, and the transmission unit 22 discards a request for which the completion message is stored in the completion list 23 without transmitting the request to the server 3, and transmits, to the server 3, a request for which the completion message is not stored in the completion list 23 and stores the request again in the request queue 21.

Thus, it is possible to guarantee that the request processing in the server 3 after the request is transmitted is reliably completed.

According to the present invention, when a hash value of the read request is included in a list of hash values stored in the completion list 23, the transmission unit 22 determines that the completion message of the request read from the request queue 21 is stored in the completion list 23.

Thus, by hashing and describing the request, the data size of each entry held in the message completion list can be reduced. Therefore, it is possible to save the amount of memory required for constructing the system and operate the present system even in a more compact environment.

According to the present invention, the transmission unit 22 deletes the completion message from the completion list 23 after discarding the request for which the completion message is stored in the completion list 23 without transmitting the request to the server 3.

Thus, the memory resources to be consumed can be restricted.

According to the present invention, in a case where the transmission unit 22 reads a predetermined request from the request queue 21 a plurality of times, the transmission unit 22 transmits the predetermined request to the server 3 to which the predetermined request has not been previously transmitted.

Thus, it is not necessary to retransmit the request to the server 3 in which the possibility of normal processing of the request such as during a failure or during a processing delay is low.

According to the present invention, in a case where the transmission unit 22 reads a predetermined request from the request queue 21 a plurality of times, the transmission unit 22 performs backoff control to leave a timing of transmitting the predetermined request for a predetermined period from a previous transmission time.

Thus, it is possible to suppress an excessive load in which the same request is continuously transmitted in a short period of time.

According to the present invention, in a case where the reception unit 24 receives the completion message of the same request from a second server 3 for a request for which the completion message from a first server 3 has already been stored in the completion list 23, the reception unit 24 instructs the second server 3 to roll back the request.

Thus, even in a case where the same request is executed by a plurality of servers 3, the occurrence of inconsistency between the client 1 and the server 3 can be reduced.

REFERENCE SIGNS LIST

1 Client
2 Load balancer (request delivery device)
3 Server
21 Request queue (request storage unit)
22 Transmission unit
23 Completion list (completion list storage unit)
24 Reception unit
100 Message communication system

The invention claimed is:
1. A request delivery device in a publish subscribe system comprising:
  a processor;
  a memory;

a request storage configured to store a request scheduled to be transmitted to a server;

a transmitter configured to transmit, to the server, the request read from the request storage, the server capable of processing the request;

a receiver configured to receive a completion message indicating that processing of the request is completed; and a completion list storage configured to store information regarding the completion message, wherein the transmitter is configured to, based on the request being stored in the completion list storage, discard the request without transmitting the request to the server, wherein the transmitter is configured to, based on the request not being stored in the completion list storage, transmit, to the server, the request and store the request again in the request storage, and wherein, based on the receiver receiving a completion message of a same request from a second server for a request for which the information regarding the completion message from a first server has already been stored in the completion list storage, the receiver instructs the second server to roll back the request.

2. The request delivery device according to claim 1, wherein, based on a hash value of the read request being included in a list of hash values stored in the completion list storage, the transmitter transmission unit determines that the information regarding the completion message of the request read from the request storage is stored in the completion list storage.

3. The request delivery device according to claim 1, wherein the transmitter is configured to, based on the request being stored in the completion list storage, delete the information regarding the completion message from the completion list storage after discarding the request without transmitting the request to the server.

4. The request delivery device according to claim 1, wherein, based on the transmitter reading a predetermined request from the request storage a plurality of times, the transmitter transmits the predetermined request to the server to which the predetermined request has not been previously transmitted.

5. The request delivery device according to claim 1, wherein, based on the transmitter reading a predetermined request from the request storage a plurality of times, the transmitter performs backoff control to block the predetermined request from being transmitted for a predetermined period from a previous transmission time.

6. A request delivery method in a publish subscribe system that is performed by a request delivery device including a request storage, a transmitter, a receiver, and a completion list storage, the method comprising:

storing, by the request storage, a request scheduled to be transmitted to a server;

transmitting, by the transmitter, the request read from the request storage to the server capable of processing the request;

receiving, by the receiver, a completion message indicating that processing of the request is completed; and storing, by the completion list storage, information regarding the completion message, wherein transmitting the request includes:
 based on the request being stored in the completion list storage, discarding the request without transmitting the request to the server, and
 based on the request not being stored in the completion list storage, transmitting, to the server, the request and storing the request again in the request storage, and wherein, based on a completion message of a same request from a second server for a request for which the information regarding the completion message from a first server has already been stored in the completion list storage being received by the receiver, the receiver instructs the second server to roll back the request.

7. A non-transitory computer recording medium of a publish subscribe system storing a request delivery program, wherein execution of the request delivery program causes one or more computers to perform operations comprising:

storing, by a request storage, a request scheduled to be transmitted to a server;

transmitting, by a transmitter, the request read from the request storage to the server capable of processing the request;

receiving, by a receiver, a completion message indicating that processing of the request is completed; and storing, by a completion list storage, information regarding the completion message, wherein transmitting the request includes:
 based on the request being stored in the completion list storage, discarding the request without transmitting the request to the server, and
 based on the request not being stored in the completion list storage, transmitting, to the server, the request and storing the request again in the request storage, and wherein, based on a completion message of a same request from a second server for a request for which the information regarding the completion message from a first server has already been stored in the completion list storage being received by the receiver, the receiver instructs the second server to roll back the request.

* * * * *